United States Patent [19]

Dittmer et al.

[11] Patent Number: 5,237,487
[45] Date of Patent: Aug. 17, 1993

[54] TRANSACTION TERMINAL HAVING BASE MODULE AND PORTABLE MODULE

[75] Inventors: Rian T. Dittmer, Atlanta; Donald L. Forsythe, Dacula, both of Ga.

[73] Assignee: NCR Corporation, Dayton, Ohio

[21] Appl. No.: 844,093

[22] Filed: Mar. 2, 1992

[51] Int. Cl.⁵ .......................... H05K 5/02; H05K 7/10
[52] U.S. Cl. .................................... 361/729; 361/683; 361/725; 364/709.1; 400/693; D18/50; 439/928
[58] Field of Search ................. D14/100, 107; D18/4, D18/50, 54, 55; 400/88, 692, 693; 439/74, 76, 928; 235/432, 433; 364/403, 708, 709.1; 361/380, 390, 391, 392, 393, 394, 395, 399

[56] References Cited

U.S. PATENT DOCUMENTS

| | | | |
|---|---|---|---|
| D. 317,756 | 6/1991 | Fabri | D18/4 X |
| 3,876,863 | 4/1975 | Boone . | |
| 3,984,075 | 10/1976 | Bahner et al. | 364/708 X |
| 4,181,966 | 1/1980 | Wenninger et al. | 364/709.1 |
| 4,359,222 | 11/1982 | Smith, III et al. | D14/100 X |
| 4,388,689 | 6/1983 | Hayman et al. . | |
| 4,460,965 | 7/1984 | Trehn et al. . | |
| 4,530,069 | 7/1985 | Desrochers . | |
| 4,545,023 | 10/1985 | Mizzi | 364/708 X |
| 4,569,421 | 2/1986 | Sandstedt | 235/383 |
| 4,650,977 | 3/1987 | Couch . | |
| 4,703,160 | 10/1987 | Narishima et al. . | |
| 4,725,694 | 2/1988 | Auer et al. . | |
| 4,727,245 | 2/1988 | Dobbins et al. | 400/88 X |
| 4,730,186 | 3/1988 | Koga et al. . | |
| 4,734,710 | 3/1988 | Sato et al. | 400/692 X |
| 4,773,032 | 9/1988 | Uehara et al. | 364/709.04 |
| 4,776,714 | 10/1988 | Sugiura et al. | 400/248 |
| 4,794,634 | 12/1988 | Torihata et al. . | |
| 4,853,682 | 8/1989 | Asano et al. | D14/100 X |
| 4,860,372 | 8/1989 | Kuzunuki et al. . | |
| 4,877,947 | 10/1989 | Mori . | |
| 4,881,839 | 11/1989 | Grimm | 400/692 |
| 4,916,441 | 4/1990 | Gombrich . | |
| 4,926,010 | 5/1990 | Citron . | |
| 5,044,965 | 9/1991 | Hayasaka | 439/76 |
| 5,047,615 | 10/1991 | Fukumoto et al. | 235/432 |
| 5,055,660 | 10/1991 | Bertagna et al. | 235/375 X |
| 5,057,676 | 10/1991 | Komaki | 235/432 X |

FOREIGN PATENT DOCUMENTS

| | | | |
|---|---|---|---|
| 2853624 | 7/1980 | Fed. Rep. of Germany | 364/403 |
| 56-129944 | 10/1981 | Japan | 364/710.13 |
| 62-263077 | 11/1987 | Japan | 400/692 |

OTHER PUBLICATIONS

IBM Technical Disclosure Bulletin, "Keyboard Equipped with Two Key Layouts", vol. 30, No. 7, Dec. 1987, pp. 428 and 429.

IBM Technical Disclosure Bulletin, "Low Cost Versatile Control Panel", vol. 28, No. 7, Dec. 1985, pp. 2948 and 2949.

IBM Technical Disclosure Bulletin, vol. 24, No. 9, Feb., 1982, pp. 4630 and 4631, "Restaurant System", C. E. Wilkinson, Jr.

Primary Examiner—Leo P. Picard
Assistant Examiner—Michael W. Phillips
Attorney, Agent, or Firm—Albert L. Sessler, Jr.

[57] ABSTRACT

A transaction terminal comprises a base module which includes a printer and a portable hand-held data input module which can be removed by a user from the base module to enable the user to move around an area such as a store to gather input data. The portable data input module can then be connected to the base module for printing of the gathered data. The portable hand-held data input module may include several types of data input devices such as a keyboard, a touch screen, a digitizer and a storage disk.

5 Claims, 7 Drawing Sheets

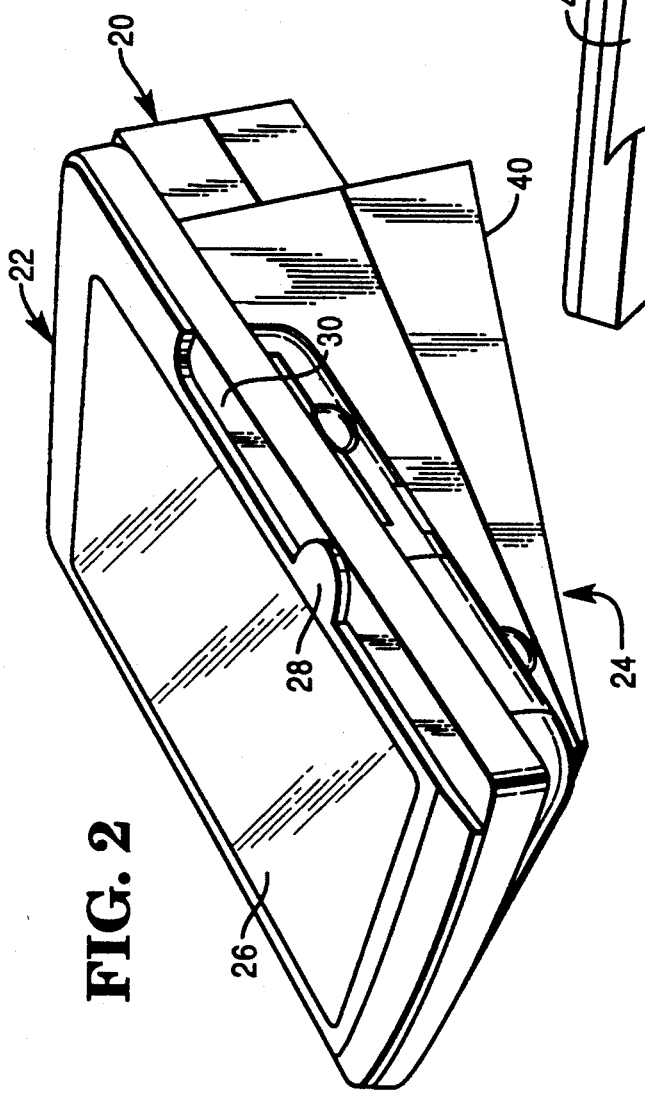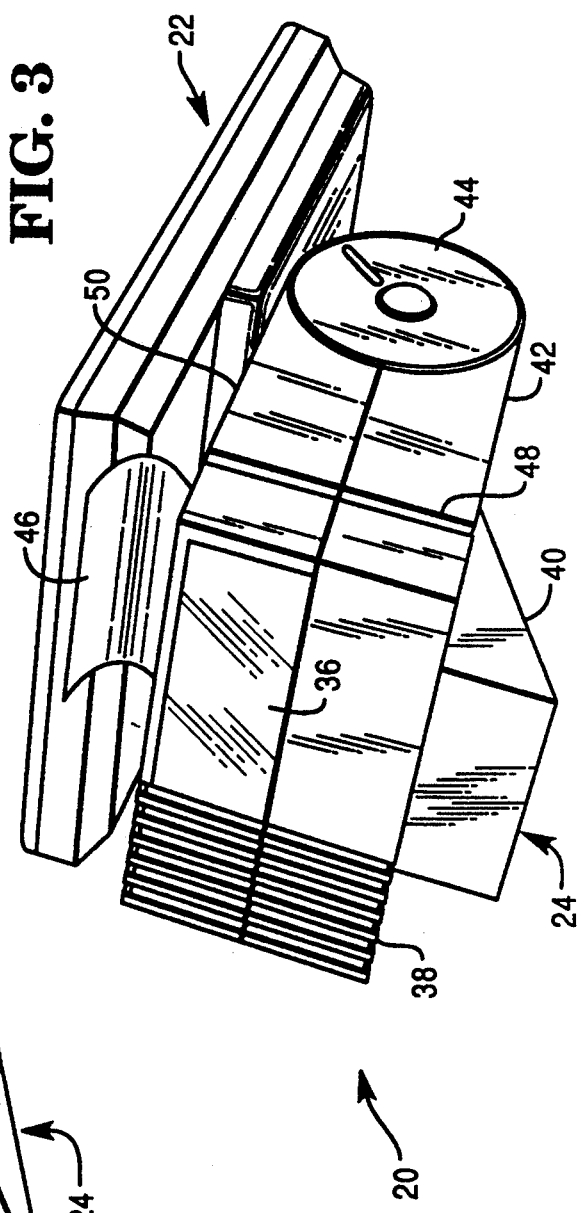

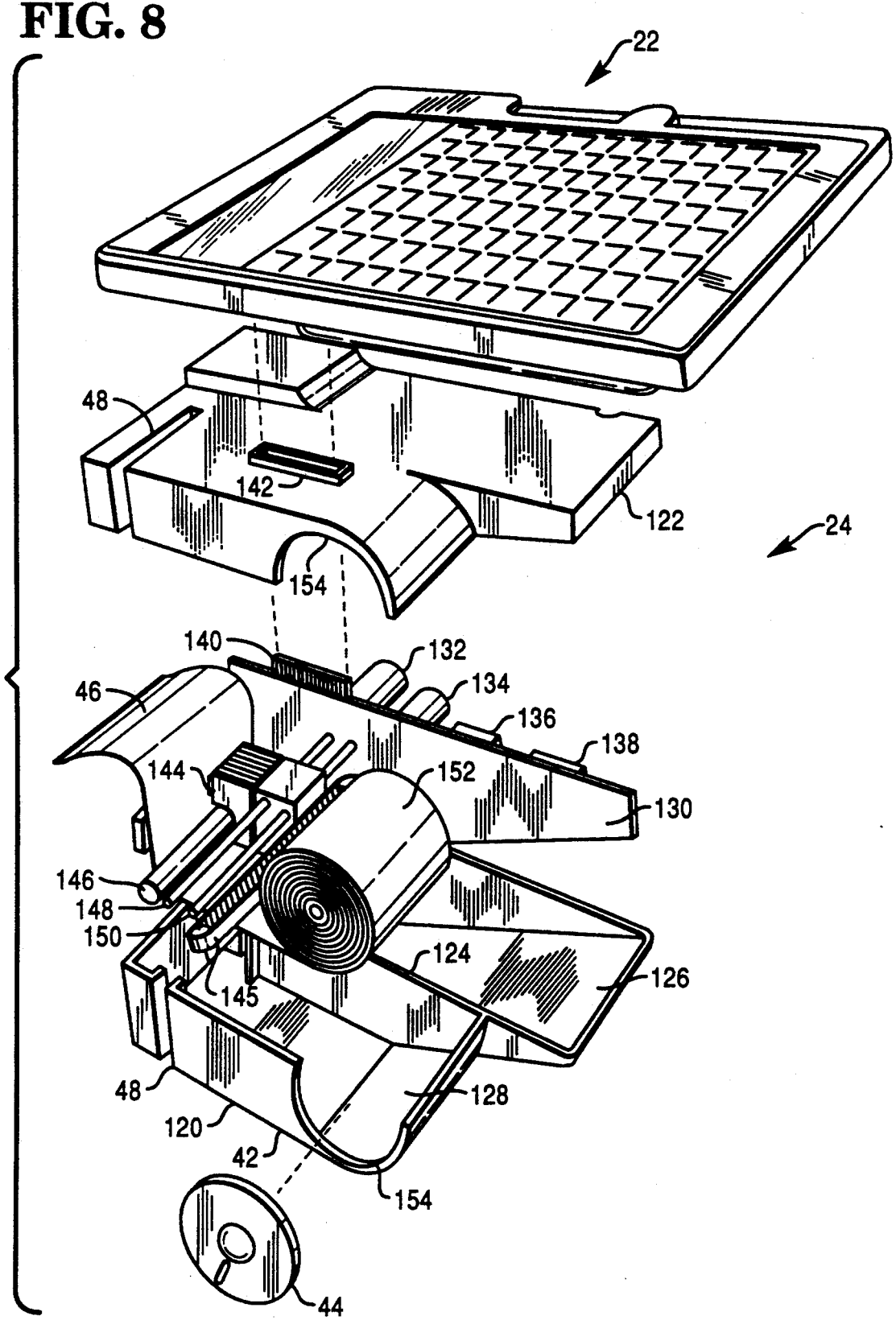

TRANSACTION TERMINAL HAVING BASE MODULE AND PORTABLE MODULE

BACKGROUND OF THE INVENTION

The present invention relates to transaction terminals and more specifically to the combination of a stationary base module which includes a printer and a portable hand-held data input module which may be detachably coupled to the base module.

In today's typical retail environment, one or more large terminals are installed in a work area, such as in the checkout section of a grocery store. These terminals then become the focal points for the customers and clerks or cashiers. One result is that valuable work space is preempted. Also the customers and clerks are forced to meet in predetermined areas of the store. To improve the quality of service, it would be desirable to have the clerks free to roam the sales floor and offer assistance to customers. Similarly, in a fast food establishment, if a customer's order is taken by an employee while he or she is waiting in line, the order can be processed more quickly, and the kitchen can be given more time to fill the order. Likewise, in a full-service restaurant, personal service is enhanced if a waiter can input and transfer an order and receive payment directly from the table being served. In a banking environment, to open an account or take out a loan, a portable terminal may be used to display the necessary forms for the institution and its customer. The terminal may be passed between a customer and a bank employee, and all information and signatures may be recorded electronically.

Therefore, it would be desirable to provide a transaction terminal having a portable hand-held data input module which can be detached from a portion of the terminal which remains in a fixed location, so that the portable module can be carried by an employee to any appropriate location of the establishment and utilized there for customer transactions.

SUMMARY OF THE INVENTION

The present invention facilitates the interaction of customers and employees in a business establishment by providing a portable hand-held data input module which may be carried by an employee to various areas of an establishment and which can be mated with a permanently located printer to enable the printing of data which is input into the portable hand-held module.

In accordance with one embodiment of the present invention, a transaction terminal comprises a portable module including a power supply, a data input device, a data processor, an external housing having a first docking surface, and an electrical connector coupled to said processor and accessible through said first docking surface of said external housing; and a base module including a power supply, a printer, an external housing including a lower support surface and a second docking surface to engage the first docking surface of the portable module, and an electrical connector coupled to said printer, and accessible through said second docking surface, to engage the electrical connector of the portable module.

In accordance with another embodiment of the present invention, a portable transaction recording module comprises a power supply; a data input device; a data processor; an external housing; a hand-held data entry device for capturing data in handwritten form and providing it to the data processor; and a receptacle for slidably mounting said hand held data entry device in said external housing.

In accordance with another embodiment of the present invention, printing apparatus comprises a lower housing having a base portion for resting on a supporting surface; an upper housing mating with the lower housing; an internal divider separating the interior of the combined upper and lower housing into a first internal space and a second internal space; a power supply located in said first internal space; and a printer located in said second internal space, said printer including a paper supply roll holder, a movable print head, and at least one shaft for supporting the print head for a linear path of movement.

It is accordingly an object of the present invention to provide a portable hand-held data input module which can be removed from a base module and carried by an employee to various areas of a business establishment.

It is another object of the present invention to provide a transaction terminal which includes a detachable portable hand-held data input module and a printer module to which the portable module can be mated for the printing of records relating to a transaction.

Another object of the present invention is to provide a stationary printer module to which can be coupled a portable hand-held input module so that data stored in the portable module can be printed by the printer module.

With these and other objects, which will become apparent from the following description, in view, the invention includes certain novel features of construction and combinations of parts, preferred forms and embodiments of which are hereinafter described with reference to the drawings which accompany and form a part of this specification.

BRIEF DESCRIPTION OF THE DRAWINGS

FIG. 2 is a right front perspective view of the assembled portable hand-held data input module and the printer module.

FIG. 3 is a left rear perspective view of the assembled portable hand-held data input module and the printer module.

FIG. 8 is an exploded perspective view showing the disassembled printer module and the portable hand-held data input module positioned in alignment therewith for connection thereto.

DETAILED DESCRIPTION

Figure 1:
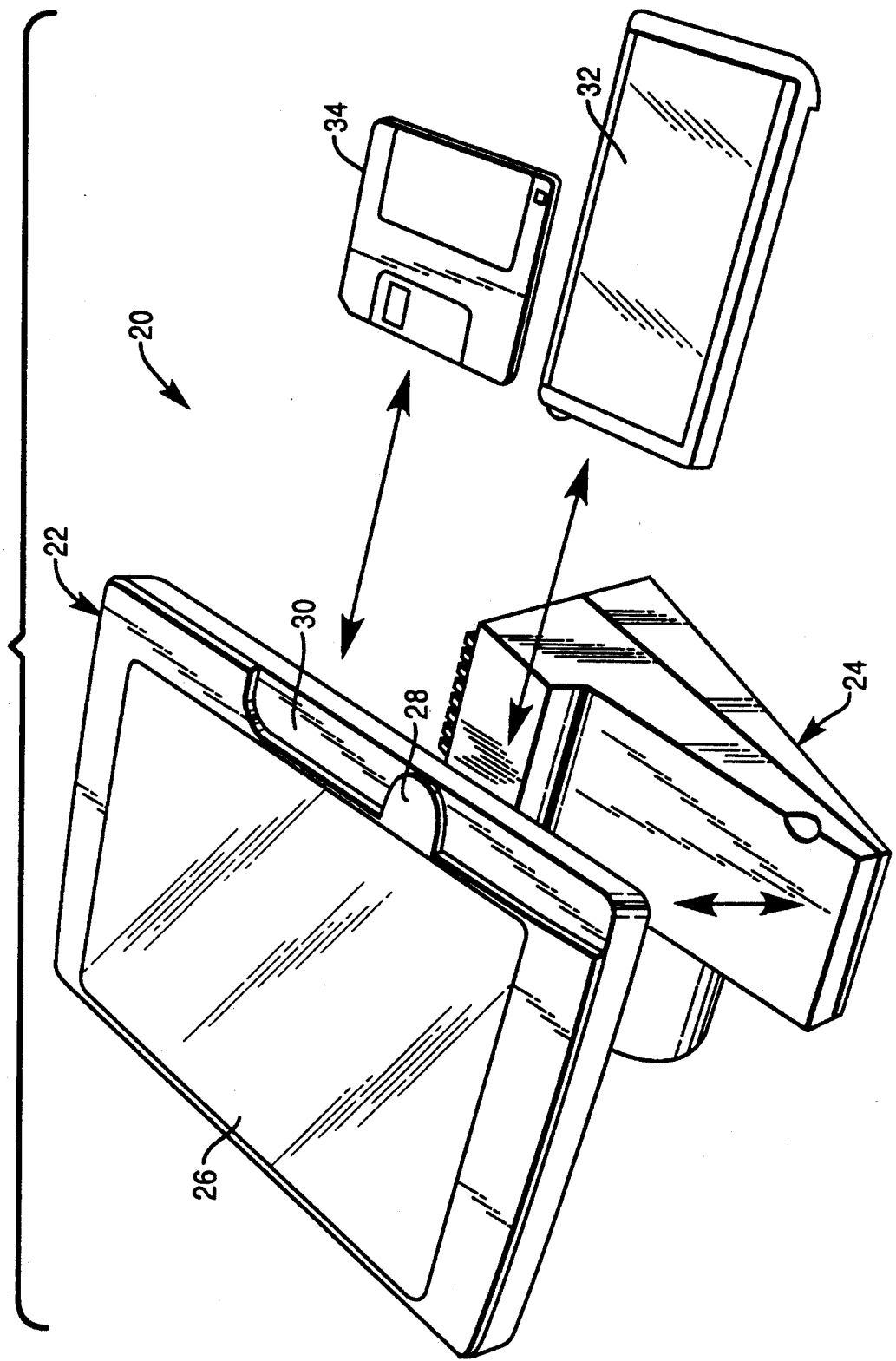
FIG. 1 is an exploded perspective view of the transaction terminal, showing the portable module, the base printer module, and the removable disk storage and digitizer units associated with the portable module.

Referring now to FIG. 1, shown there is a transaction terminal 20 which comprises a portable hand-held data input module 22 and a base module 24 that includes a printer and a power supply. The hand-held module 22 may be selectively engaged with and disengaged from the base module 24. An upper surface 26 of the module 22 provides means for inputting of data, which may include a keyboard and display or a touch screen, as will subsequently be described. Additional means for inputting data to the module 22 include a magnetic stripe reader 28 with associated guideway 30, a digitizer 32 on which hand-written data can be input, and a data storage disk 34.

FIGS. 2 and 3 show two perspective views of the transaction terminal 20 in which the hand-held input module 22 is operatively connected or docked with the base module 24. As will subsequently be described in greater detail, such docking includes the mating of electrical connectors on the modules 22 and 24 to enable data stored in the module 22 to be printed by a printer in the module 24. As best seen in FIG. 3, the base unit 24 may optionally include a display 36, on which data to be printed by the printer is displayed for the scrutiny of a customer. Cooling fins 38 are provided for the power supply contained within the base module 24. The portion of the base module 24 containing the power supply is provided with a flat horizontal lower surface 40 which functions as a base for resting the base module upon a supporting surface such as a counter or table. The portion of the base module 24 containing the printer has a bottom surface 42 which is angled upwardly from one end which is positioned at the same level as the surface 40, and which includes a receptacle and a circular cover 44 for a paper supply roll, which is used to provide paper 46 for a receipt or other document printed by the printer. A slot 48 in the printer portion of the base module 24 enables a paper slip to be inserted to be printed upon for validation or other purpose. The angled orientation of the printer resulting from the slanted bottom surface 42 provides clearance to enable the slip to be printed upon to extend below the bottom surface of the printer portion to facilitate positioning of the slip in the printer. The upper surface 50 of the module 24 is generally parallel to the lower surface 42, so as to provide a slanted surface on which the hand-held data input module 22 may be positioned, thus providing an optimum angle for using the keyboard and viewing the display associated with the upper surface 26 of the module 22.

Figure 4:
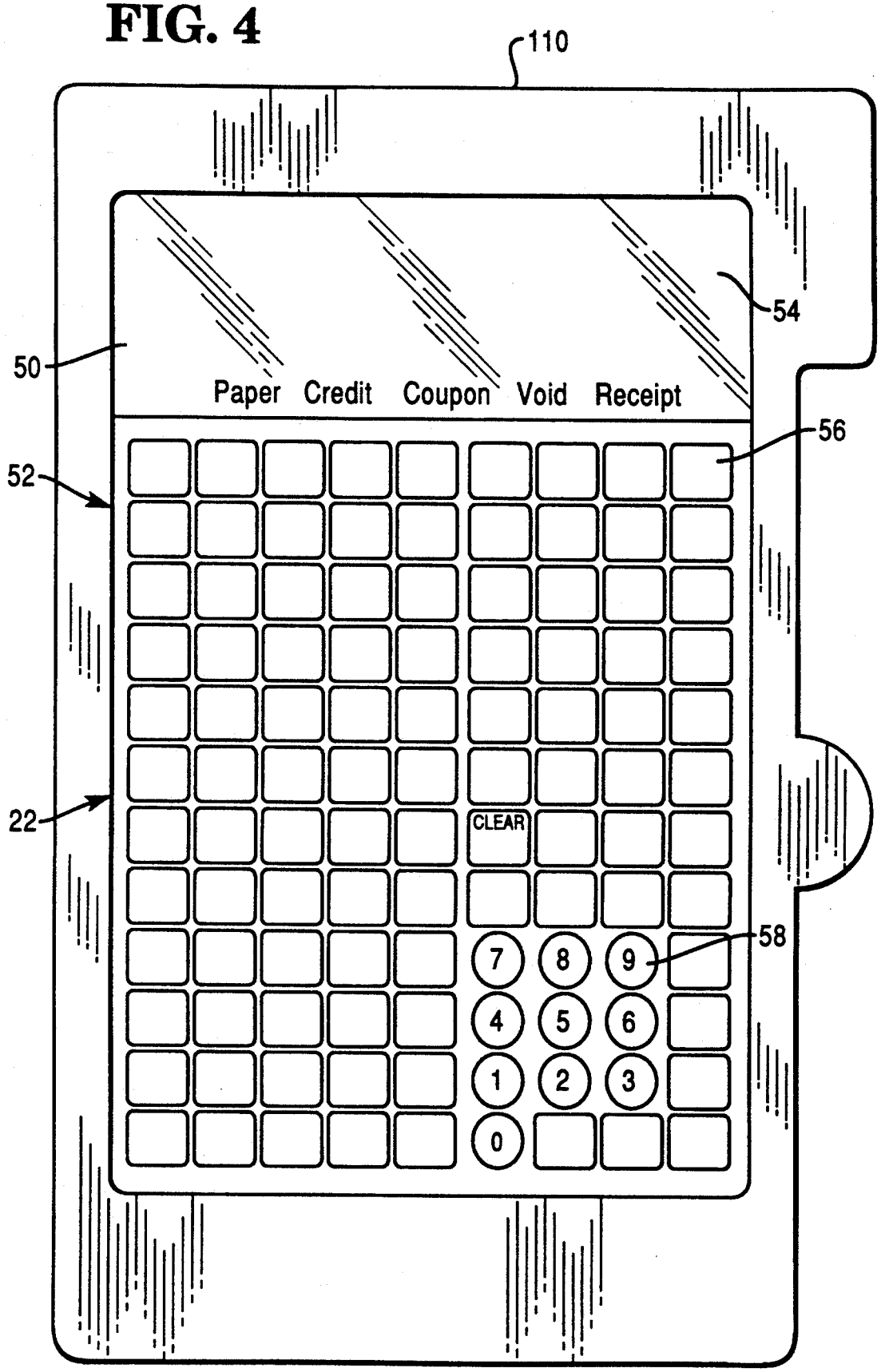
FIG. 4 is a plan view of one embodiment of the data input surface of the portable hand-held data input module which includes a full matrix keyboard of preselected keys and a two-line display.
Figure 5:
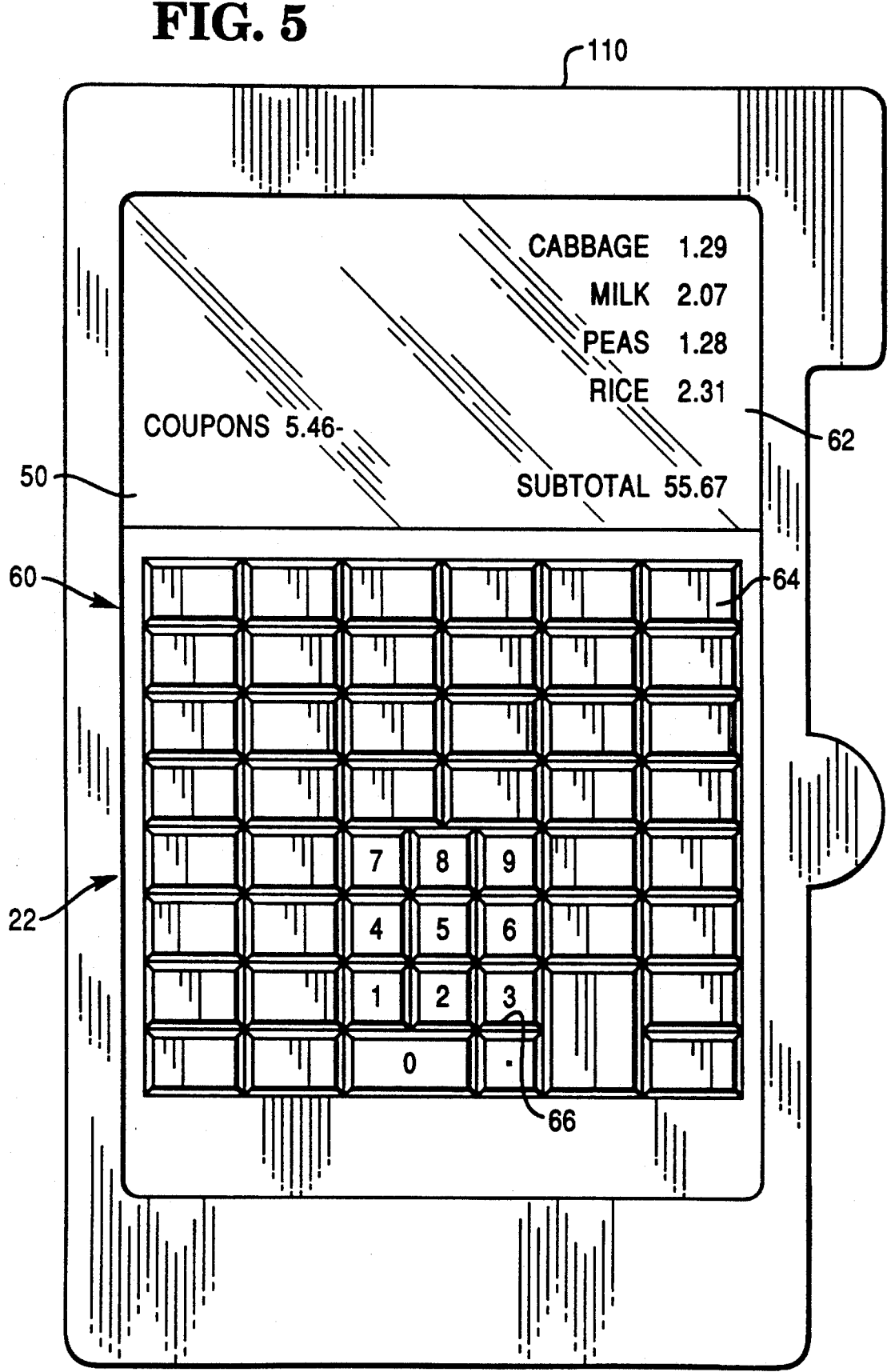
FIG. 5 is a plan view of a second embodiment of the data input surface of the portable hand-held data input module which includes a limited point of sale tactile keyboard array and a multi-line display.
Figure 6:
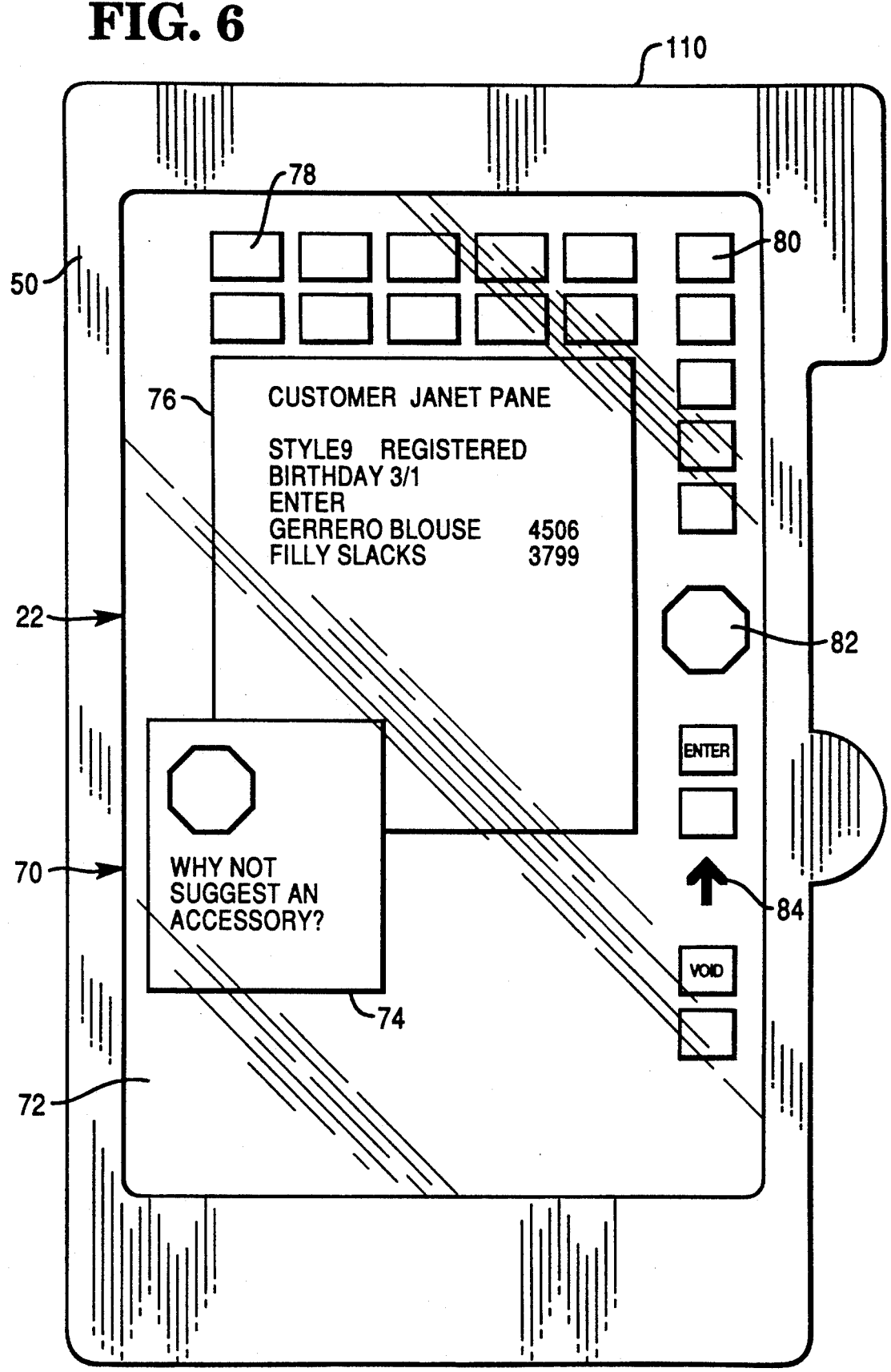
FIG. 6 is a plan view of a third embodiment of the data input surface of the portable hand-held data input module which includes a flat panel touch-sensitive display providing a touch screen option.

Three different arrangements are shown in FIGS. 4, 5 and 6 for providing the data input and display capabilities desired for the portable data input module 22. The arrangement 52 shown in FIG. 4 includes a small display 54, typically a two-line display, positioned adjacent to the top of the surface 50, and a full keyboard comprising function keys 56 and numeric keys 58 located below the display 54. The keys are of the micromotion type providing limited tactile feel and require close visual attention to the keyboard. An arrangement of this type might typically be used in a fast food or full service restaurant application in which each key represents one function or selection and must be carefully searched out.

The arrangement 60 shown in FIG. 5 includes a larger display 62 than that used in the embodiment of FIG. 4, and also includes a keyboard comprising function keys 64 and numeric keys 66. The function keys 64 are fewer in number than those in the embodiment of FIG. 4, but are full travel keys which are better suited to operation by an operator in a "touch" mode. This is also true of the numeric keys 66. An arrangement of this type might typically be used in a grocery checkout or department store application.

The arrangement 70 shown in FIG. 6 comprises a touch screen 72, which is higher in cost than the keyboard arrangements of FIGS. 4 and 5, but which can be programmed to provide a large number of configurations in accordance with the nature of the application in which the terminal 20 is to be used. One such application is shown in FIG. 6, in which two overlapping display areas 74 and 76 are combined with a group of function keys 78, a plurality of lead-through function keys 80, a special symbol key 82 which is used to direct the operator's attention to a message in the smaller display 74, and a sequence indicator 84.

Figure 7:
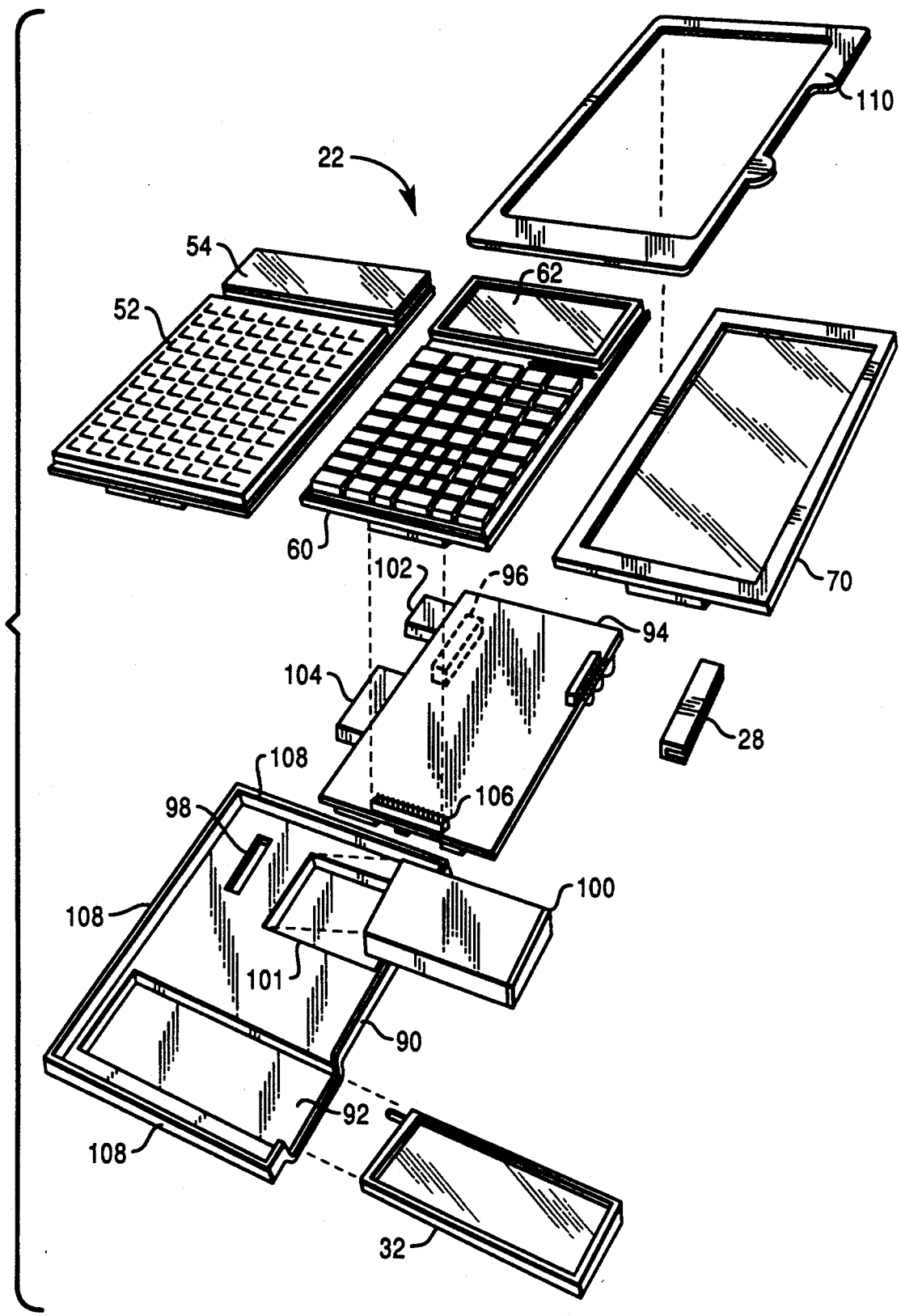
FIG. 7 is an exploded perspective view of the portable hand-held data input module with three of the optional keyboard units, any one of which may be included in the portable hand-held data input module.

The exploded view of FIG. 7 shows the various parts which make up the portable hand-held module 22. A base 90 supports and retains the various elements of the module 22 and includes a tray-shaped receptacle 92 for slidably receiving and holding the digitizer 32. A processor printed circuit board 94 fits within the base 90 and an electrical connector 96 on the lower surface of the circuit board 94 extends downwardly through an opening 98 in the base 90 to be engageable with a complementary connector in the base module 24, as will subsequently be described. Physically and electrically connected to the circuit board 94 are the magnetic stripe reader 28, a battery 102, a fixed disk 104 and an electrical connector 106 which provides an electrical connection to a selected one of the data input devices 52, 60 or 70. A receiver 100 for the storage disk 34 fits within an aperture 101 in the base 90, and is electrically coupled to the circuit board 94. The selected data input device 52, 60 or 70 fits within side walls 108 of the base 90 above the circuit board 94. A top bezel 110 is fixed in position above the data input device to retain the module 22 in assembled condition.

The exploded view of FIG. 8 shows the various parts which make up the printer module 24. A lower housing unit 120 and an upper housing unit 122, when assembled, comprise the housing of the printer module 24. An internal divider 124 divides the interior of the housing into a power supply space 126 and a printer space 128. A power supply circuit board 130, on which are mounted a plurality of electrical components, such as components 132, 134, 136, and 138, is secured within the power supply space 126. An electrical connector 140 is also fixed to the circuit board and extends upwardly through an aperture 142 in the upper housing unit 122 for engagement with the complementary connector 96 of the portable hand-held module.

In the printer space 128, a printhead 144 driven by a belt 145 is mounted for sliding linear movement on a plurality of shafts 146, 148 and 150 for printing on the paper 46, which is supplied from a paper supply roll 152 mounted on a shaft (not shown) anchored in the divider 124. The paper roll 152 is replaced when exhausted through an aperture formed by the two semi-circular openings 154 in the upper and lower housing units 120 and 122. The circular cover 44 is used to cover this aperture. It will be noted that the validation slot 48 extends through both the upper and lower housing units 120 and 122, and is positioned so that a paper slip introduced therein can be printed upon by the printhead 144.

It will also be noted that the bottom surface 42 of the printer space is inclined upwardly so that there is a clearance between it and the surface upon which the module 24 rests, so that there is room to insert the slip so that any portion thereof can be placed into alignment with the printhead 144.

The transaction terminal of the present invention can readily be used in a wide variety of applications in which customers of various business establishments such as, for example, fast food restaurants, full service restaurants, supermarkets, department stores and banks, may be queued in line or otherwise waiting for service, which can be provided by a roving employee equipped with a portable data input device. The data input module 22 of the transaction terminal 20 can readily be detached from the base module 24, carried and used by such a roving employee, and then reattached to the base module 24 for printing a permanent record of the transactions made.

While the forms of the invention shown and described herein are admirably adapted to fulfill the objects primarily stated, it is to be understood that it is not intended to confine the invention to the forms or embodiments disclosed herein, for it is susceptible of embodiment in various forms within the scope of the appended claims.

What is claimed is:

1. A transaction terminal comprising:
   a portable module including a power supply, a data input device, a data processor coupled to the power supply and the data input device, an external housing having a first docking surface, and an electrical connector coupled to said processor and accessible through an aperture in said first docking surface of said external housing; and
   a base module including a lower housing having a base portion for resting on a supporting surface, an upper housing mating with the lower housing, and having a second docking surface with an aperture therein on said upper housing, an internal divider separating the interior of the combined upper and lower housings into a first internal space and a second internal space, the floor of the second internal space being angled upwardly from one end thereof so that it is not flush with a supporting surface on which the base portion rests, a power supply located in said first internal space, a printer located in said second internal space and coupled to said power supply, and an electrical connector coupled to said printer and accessible through the aperture in said second docking surface for engagement with the electrical connector of the portable module, said printer including a paper supply roll holder, a movable print head, and at least one shaft for supporting the print head for movement in a linear path.

2. The printing apparatus of claim 1, in which said base portion is located to one side of said internal divider and forms the floor of the first internal space in which the power supply is located.

3. The printing apparatus of claim 1, in which said one end of said second internal space is cylindrical in shape to accommodate a paper supply roll placed within said second internal space.

4. The printing apparatus of claim 1, in which a validation slot is provided in the upper and lower housings adjacent tot he path of movement of the print head.

5. The printing apparatus of claim 1, also including a display on the outside of the printing apparatus.

* * * * *

UNITED STATES PATENT AND TRADEMARK OFFICE
CERTIFICATE OF CORRECTION

PATENT NO. : 5,237,487
DATED : August 17, 1993
INVENTOR(S) : Rian T. Dittmer et al.

It is certified that error appears in the above-identified patent and that said Letters Patent is hereby corrected as shown below:

Column 6, line 32, "tot" should be --to--, and "he" should be --the--.

Signed and Sealed this

Eighth Day of March, 1994

BRUCE LEHMAN

Attest:

Attesting Officer                Commissioner of Patents and Trademarks